(12) United States Patent
Oz

(10) Patent No.: US 10,863,212 B2
(45) Date of Patent: Dec. 8, 2020

(54) METHOD AND SYSTEM FOR FUSING USER SPECIFIC CONTENT INTO A VIDEO PRODUCTION

(71) Applicant: PIXELLOT LTD., Petach Tikva (IL)

(72) Inventor: Gal Oz, Kfar Saba (IL)

(73) Assignee: PIXELLOT LTD., Petach Tikva (IL)

( * ) Notice: Subject to any disclaimer, the term of this patent is extended or adjusted under 35 U.S.C. 154(b) by 0 days.

(21) Appl. No.: 16/626,588

(22) PCT Filed: Jun. 27, 2018

(86) PCT No.: PCT/IL2018/050705
§ 371 (c)(1),
(2) Date: Dec. 26, 2019

(87) PCT Pub. No.: WO2019/003227
PCT Pub. Date: Jan. 3, 2019

(65) Prior Publication Data
US 2020/0120369 A1    Apr. 16, 2020

Related U.S. Application Data

(60) Provisional application No. 62/525,221, filed on Jun. 27, 2017.

(51) Int. Cl.
*H04N 7/173* (2011.01)
*H04N 21/234* (2011.01)
(Continued)

(52) U.S. Cl.
CPC ... *H04N 21/23424* (2013.01); *H04N 21/2187* (2013.01); *H04N 21/21805* (2013.01); *H04N 21/812* (2013.01); *H04N 21/8146* (2013.01)

(58) Field of Classification Search
CPC ....... H04N 21/23424; H04N 21/21805; H04N 21/2187; H04N 21/812; H04N 21/8146;
(Continued)

(56) References Cited

U.S. PATENT DOCUMENTS

| 6,100,925 A | 8/2000 | Rosser et al. |
| 2008/0192116 A1 | 8/2008 | Tamir et al. |

(Continued)

OTHER PUBLICATIONS

International Search Report dated Jun. 18, 2019 for corresponding Application No. PCT/IL2018/050705, filed Jun. 27, 2018.
(Continued)

*Primary Examiner* — Michael B. Pierorazio
(74) *Attorney, Agent, or Firm* — Pearl Cohen Zedek Latzer Baratz LLP

(57) ABSTRACT

Generally, a method for fusing viewer-specific graphic content into video content being broadcasted to a plurality of viewer terminals are provided. The method may include the following steps: receiving a video content including a plurality of frames representing a scene; deriving a virtual camera model for a subset of frames of the video content; generating a foreground mask for each frame of the subset of frames of the video content; and substituting, in at least part of the frames of the subset of frames of the video content received on at least some of the plurality of viewer terminals, all pixels in the respective frames contained within a predefined content insertion region of a background surface in the scene, except for the pixels indicated by the respective frames' foreground masks, with pixels of viewer-specific graphic contents associated with the respective viewer terminals, using the respective frames' virtual camera models.

10 Claims, 9 Drawing Sheets

(51) Int. Cl.
*H04N 21/218* (2011.01)
*H04N 21/2187* (2011.01)
*H04N 21/81* (2011.01)

(58) Field of Classification Search
CPC ....... H04N 21/23418; H04N 21/25891; H04N 21/8133
USPC ........................................................ 725/116
See application file for complete search history.

(56) References Cited

U.S. PATENT DOCUMENTS

| | | |
|---|---|---|
| 2009/0060321 A1 | 3/2009 | Gillard et al. |
| 2010/0050082 A1 | 2/2010 | Katz et al. |
| 2011/0102678 A1 | 5/2011 | House et al. |
| 2012/0249831 A1 | 10/2012 | Porter |
| 2016/0104510 A1 | 4/2016 | Tamir et al. |
| 2017/0178687 A1 | 6/2017 | Tamir et al. |

OTHER PUBLICATIONS

Extended European Search Report for EP Patent Application No. 18823353.0 dated Oct. 12, 2020.
Charalampos Patrikakis et al.: "Personalized Coverage of Large Athletics Events", IEEE Multimedia, IEEE Service Center, New York, NY, US, vol. 18, No. 4, Apr. 1, 2011, pp. 18-29.

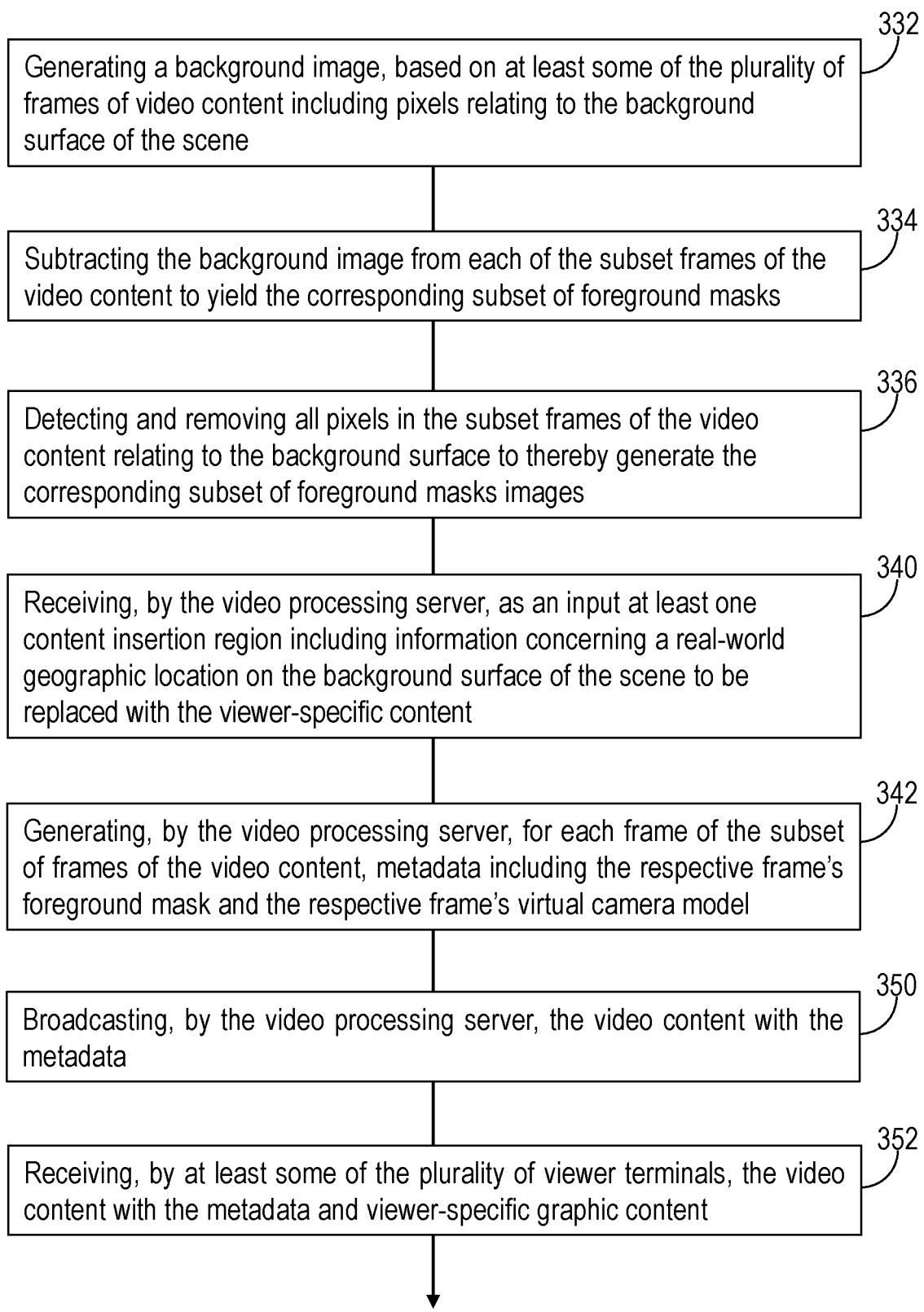
Figure 3 (cont. 1)

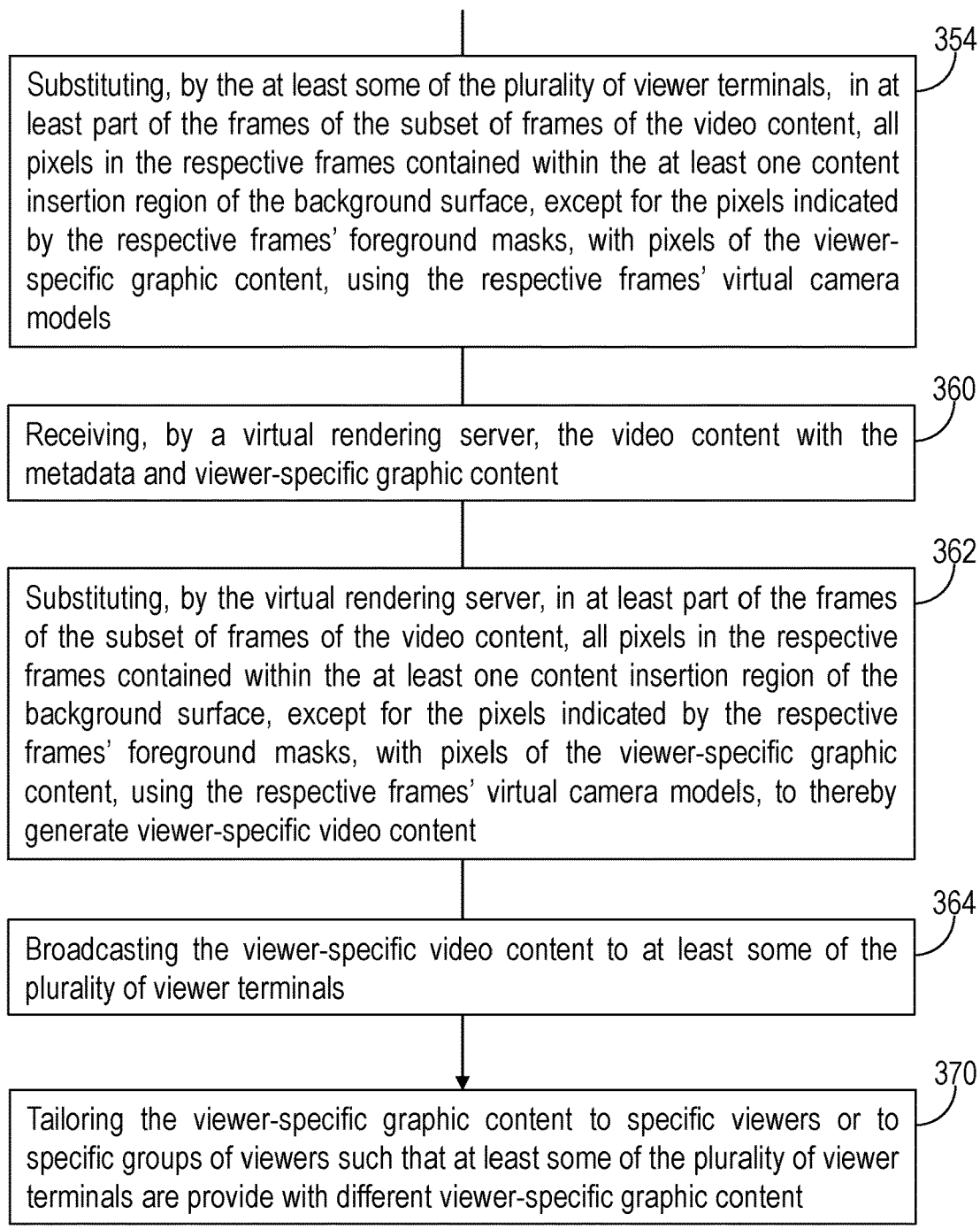
Figure 3 (cont. 2)

METHOD AND SYSTEM FOR FUSING USER SPECIFIC CONTENT INTO A VIDEO PRODUCTION

CROSS-REFERENCE TO RELATED APPLICATIONS

This application is a National Phase Application of PCT International Application No. PCT/IL2018/050705, International Filing Date Jun. 27, 2018, claiming the benefit of U.S. Patent Application No. 62/525,221, filed Jun. 27, 2017, which is hereby incorporated by reference.

FIELD OF THE INVENTION

The present invention relates to the field of video production, and more particularly, to fusing user-tailored content into a video broadcast.

BACKGROUND OF THE INVENTION

Automatic video content production of sport events become more and more popular in recent years with the introduction of dedicated hardware and software. For many years, it has been suggested that advertisements can be fused into the video content in a manner that will enable viewers to watch the video broadcast with some portions of the surface exhibiting advertising content.

However, many challenges and specifically those relating to the relationship between foreground objects (e.g., players) and background surface prevented satisfactory results, mainly due to obstruction interference between the fused content and the foreground objects.

SUMMARY OF THE INVENTION

One aspect of the present invention provides a method of fusing viewer-specific graphic content into a video content being broadcasted to a plurality of viewer terminals, the method may include: receiving, by a video processing server, a video content comprising a plurality of frames, wherein each of the plurality of frames represents a scene comprising background surface and objects of interest; deriving, by the video processing server, for each frame of a subset of frames of the plurality of frames, a virtual camera model that correlates each of pixels of the respective frame with a real-world geographic location in the scene associated with the pixel thereof; generating, by the video processing server, for each frame of the subset of frames, a foreground mask comprising pixels relating to the objects of interest; and substituting, by at least some of the plurality of viewer terminals, in at least part of the frames of the subset of frames of the video content, all pixels in the respective frames contained within at least one predefined content insertion region of the background surface, except for the pixels indicated by the respective frames' foreground masks, with pixels of viewer-specific graphic contents associated with the viewer terminals thereof, using the respective frames' virtual camera models.

Another aspect of the present invention provides a system for fusing viewer-specific graphic content into a video content being broadcasted to a plurality of viewer terminals, the system may include: a video processing server arranged to: receive a video content comprising a plurality of frames, wherein each of the plurality of frames represents a scene comprising background surface and objects of interest; derive, for a subset of frames of the plurality of frames of the video content, a virtual camera model correlating each of pixels of the respective frame with a real-world geographic location in the scene associated with the pixel thereof; and generate, for each frame of the subset of frames, a foreground mask comprising the pixels relating to the objects of interest; and a plurality of viewer terminals in communication with the video processing server, wherein at least some of the plurality of viewer terminals is arranged to substitute, in at least part of the frames of the subset of frames, all pixels in the respective frames contained within a predefined content insertion region of the background surface, except for the pixels indicated by the respective foreground masks as related to the objects of interest, with pixels of viewer-specific graphic contents associated with the respective viewer terminals thereof, using the respective virtual camera models.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
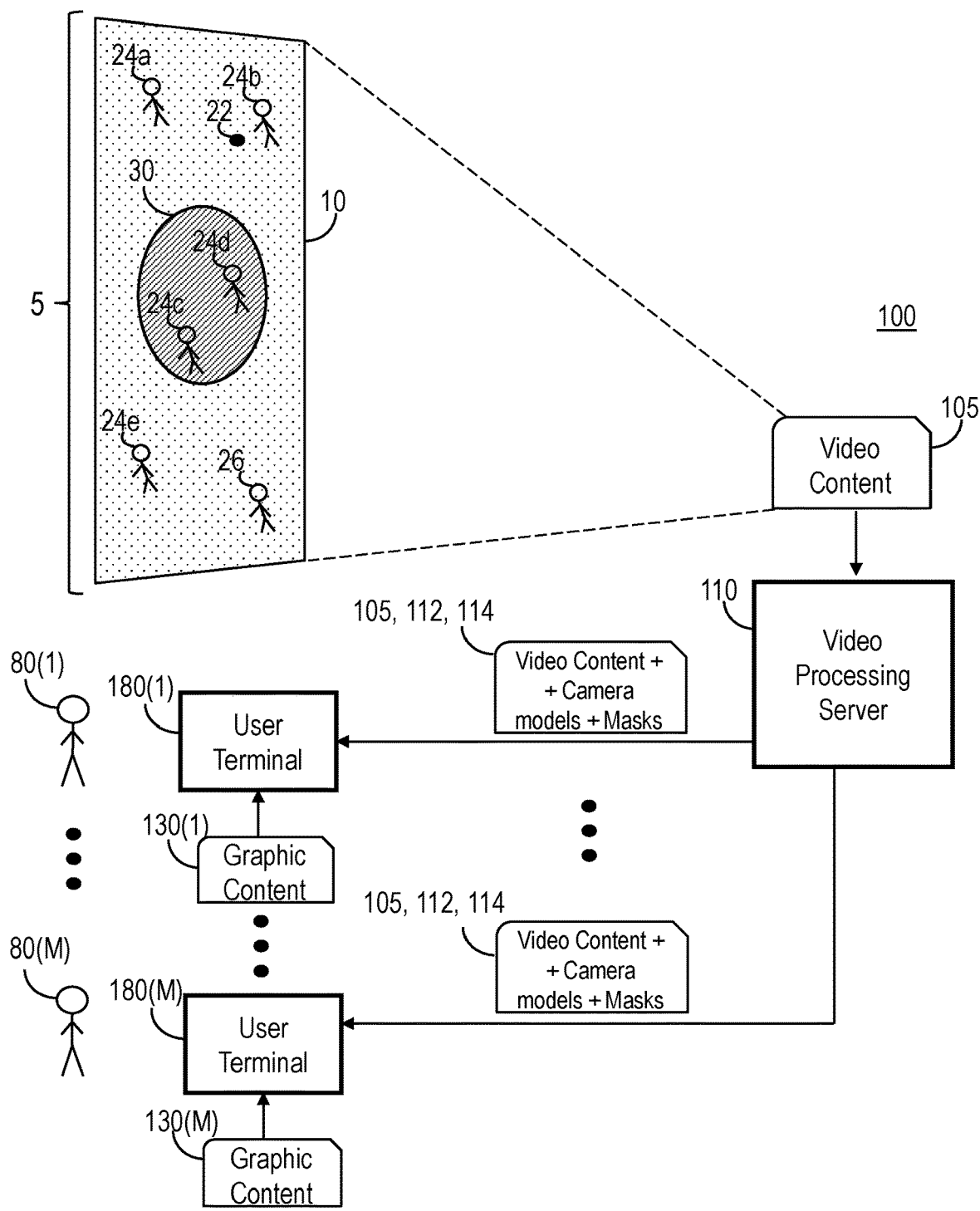
FIGS. 1A, 1B and 1C are schematic illustrations of various configurations of a system for fusing viewer-specific graphic content into a video content being broadcasted to a plurality of user terminals, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Embodiments of the present invention provide a system and a method for fusing viewer-specific graphic content (such as advertisements) into a video content being broadcasted to a plurality of user terminals. The system may include a video processing server arranged to receive, or generate, a video content representing a scene at, for example, a sport event (e.g., such as soccer, basketball, football, etc.). The video content may include a plurality of frames.

The video processing server may derive, for a subset of frames of the plurality of frames of the video content, corresponding subset of virtual camera models and corresponding subset of foreground masks. In some embodiments, the frames of the subset are selected based on specified time period(s)/duration(s) during the sport event during which the viewer-specific graphic content is intended to be fused into the video content being broadcasted. The video processing server may further broadcast the video content in which the frames of the subset are accompanied with metadata that includes the respective virtual camera models and the respective foreground masks.

In various embodiments, the video content may be received at viewer terminals or at a virtual rendering server together with viewer-specific graphic content (such as advertisements, logos, etc.) to be fused therein.

The viewer terminals/the virtual rendering server may be arranged to fuse the user-specific graphic content into the video content by substituting all pixels in the frames of the subset that are contained within a predefined content insertion region in the scene, except for the pixels that are indicated by the respective frames' foreground masks, and using the respective frames' virtual camera models, with pixels of the user-specific graphic content thereof.

In various embodiments, the viewer-specific graphic content may be tailored to each of the viewers individually or to different groups of viewers (e.g., men, women, children, etc.). Thus, in some embodiments, each of the viewer terminals, or groups of the viewer terminals, may receive video content with the viewer-tailored and possibly different graphic content being fused therein, wherein the fusion takes into account the foreground so as to eliminate collisions and obstructions.

Advantageously, the disclosed system and method may enable fusion of alternative graphic content into the video content being broadcasted directly on either viewer terminals or virtual rendering server (and remotely from the video processing server), thereby providing high flexibility in tailoring the alternative graphic content to specific viewers/groups of viewers while eliminating a need in repeatable, complex and resource consuming preparation stages of the video content (e.g., generation of the foreground masks and virtual camera models) that may be performed only once on the video processing server.

Figure 1B:
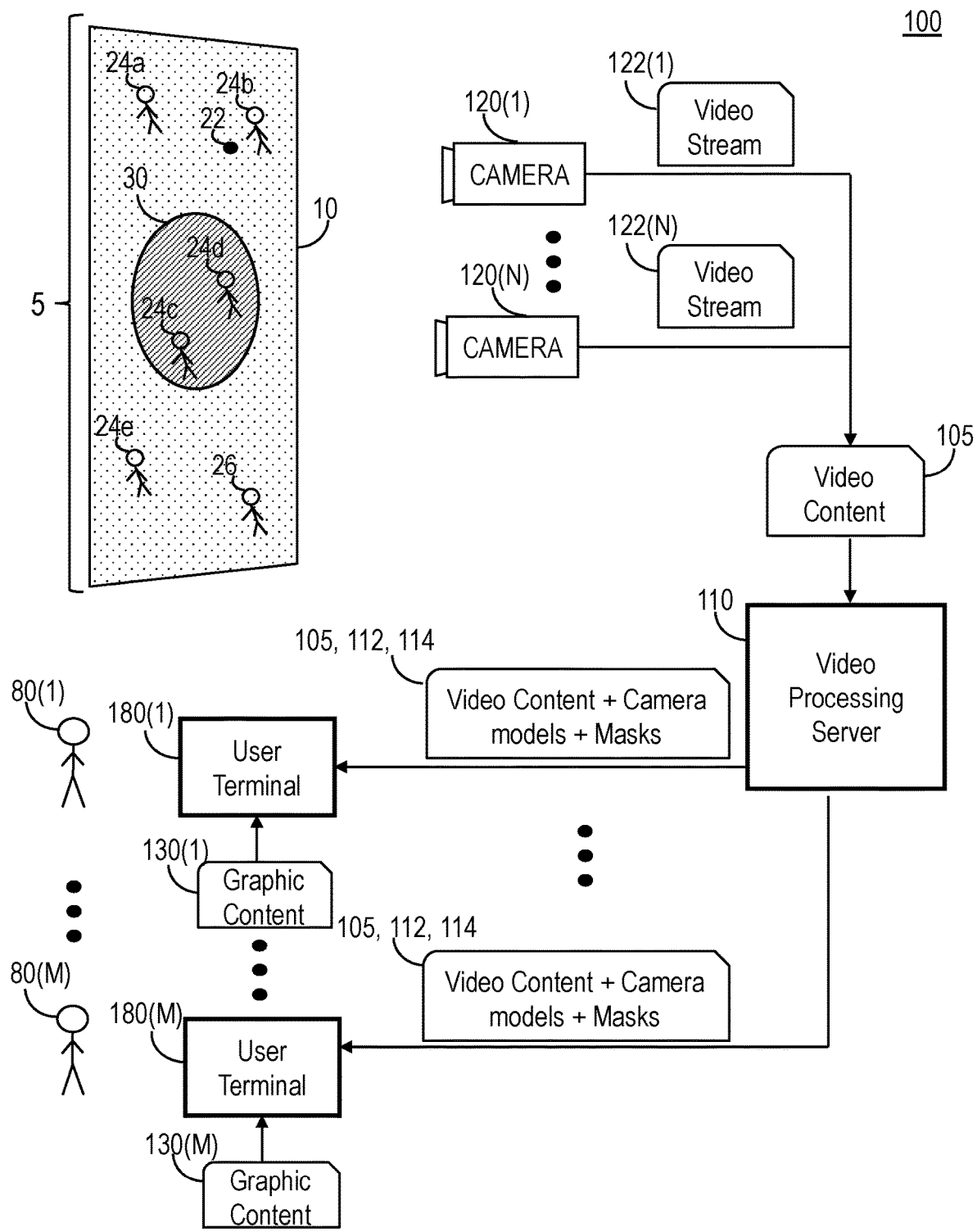
Figure 1C:
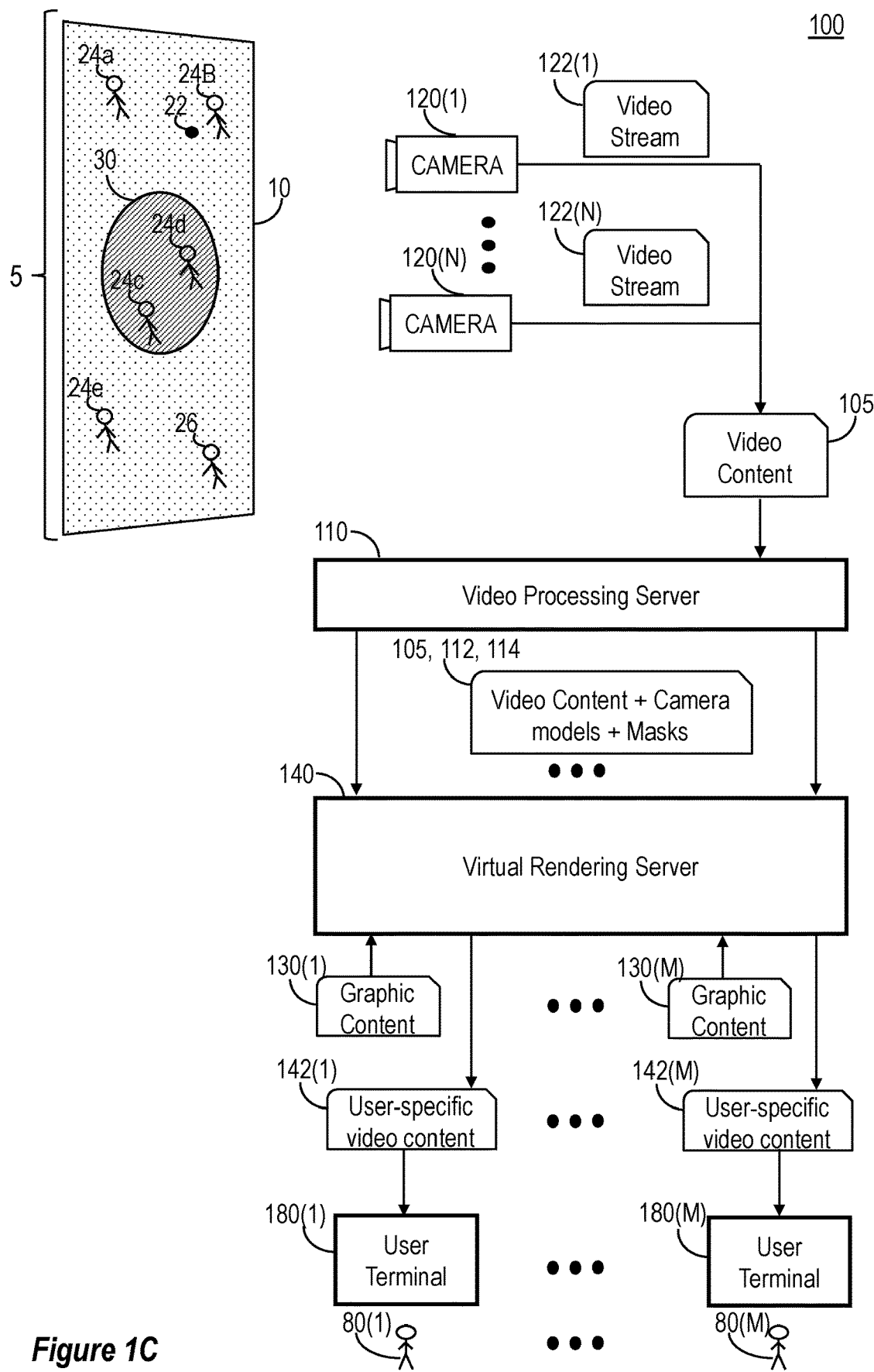

Reference is now made to FIGS. 1A, 1B and 1C, which are schematic illustrations of various configurations of a system 100 for fusing viewer-specific graphic content into a video content being broadcasted to a plurality of user terminals, according to some embodiments of the invention.

According to some embodiments, system 100 may include a video processing server 110 and a plurality of user terminals 180(1) to 180(M) (such as, for example, smartphones, tablet computers, clouds, smart TVs, etc.) in communication with video processing server 110. In some embodiments, user terminals 180(1) to 180(M) may be associated with a plurality of viewers 80(1) to 80(M).

Video processing server 110 may receive (e.g., locally or over a network) a video content 105 (e.g., as shown in FIG. 1A). Video content 105 may include a plurality of frames. Video content 105 may represent a scene 5 at, for example, a sport event (e.g., soccer game, basketball game, etc.). Scene 5 may, for example, include a stationary/background surface 10 and objects of interest 20. For example, stationary/background surface 10 may be a game-field and/or objects of interest 20 may be moving objects such as a ball 22, players 24a to 24e and/or a referee 26 of the sport event. Accordingly, the frames of video content 105 may include pixels relating to stationary/background surface 10 and pixels relating to objects of interest 20.

In some embodiments, system 100 may include at least one camera 120 (e.g., static or dynamic camera). Camera 120 may be directed at, for example, scene 5 of the sport event and may be arranged to capture video footage and convey its respective video stream 122 to video processing server 110. In these embodiments, video processing server 110 may be arranged to receive video stream 122 and to generate video content 105 based on video stream 122 (e.g., as described below with respect to FIGS. 2A and 2B).

In some embodiments, system 100 may include plurality of cameras 120(1) to 120(N) directed at scene 5 of the sport event arranged to capture video footages and to convey their respective video streams 122(1) to 122(N) to video processing server 110 (e.g., as shown in FIGS. 1B and 1C). Video processing server 110 may be further arranged to generate video content 105 based on at least some of video streams 122(1) to 122(N). In these embodiments, each of plurality of cameras 120(1) to 120(N) may be directed at a different angle so as all of plurality of cameras 120(1) to 120(N) together may provide a panoramic view of the scene and video content 105 (being generated by video processing server 110) may further include all possible angles the scene 5.

In some embodiments, video processing server 110 may be arranged to derive, for each frame of a subset of frames of the plurality of frames of video content 105, a virtual camera model, to yield corresponding subset of virtual camera models 112 (e.g., as described below with respect to FIG. 2). The virtual camera model of each frame of the subset of frames of video content 105 may, for example, correlate each of the pixels of the respective frame with a real-world geographic location associated with the pixel thereof (e.g., as described below with respect to FIG. 2).

In some embodiments, the frames of the subset are selected based on specified time period(s)/duration(s) of the sport event during which the viewer-specific graphic content is intended to be fused into the video content. In some embodiments, the subset of frames includes all the plurality of frames of video content 105.

In some embodiments, video processing server 110 may be arranged to generate, for each frame of the subset of frames of video content 105, a foreground mask, to yield corresponding subset of foreground masks 114 (e.g., as described below with respect to FIGS. 2A and 2B). The foreground mask of each frame of the subset of frames may, for example, include pixels relating to objects of interest 20 (ball 22, players 24, referee of the sport event 26, etc.).

According to some embodiments, video processing server 110 may be arranged to broadcast (for example, over a network) video content 105 to at least some of plurality of user terminals 180(1) to 180(M), wherein each frame of the subset of frames of video content 105 is accompanied with metadata that includes the respective frame's virtual camera model and the respective frame's foreground mask (e.g., as shown in FIGS. 1A and 1B).

At least some of user terminal 180(1) to 180(M) may receive a respective and possibly different viewer-specific graphical content 130(1) to 130(M) (such as advertisement, logos, etc.) (e.g., as shown in FIGS. 1A and 1B). In various embodiments, each (or at least some) of viewer-specific graphic content 130(1) to 130(M) may be tailored to each of the viewers 80(1) to 80(M) individually or to different groups of viewers (e.g., men, women, children, etc.).

At least some of user terminals 180(1) to 180(M) may be arranged to substitute (e.g., by a computer processor) all pixels in at least part of the frames of the subset of frames of video content 105 that are contained within a predefined content insertion region 30 of background/stationary surface 10, except for the pixels that are indicated by the respective frames' foreground masks 114 as relating to objects of interest 20 (e.g., to players 24c, 24d, as shown in FIGS. 1A and 1B), with pixels of user-specific graphic content 130(1) to 130(M) associated with the at least some user terminals thereof, using the respective frames' virtual camera models 112. Thus, at least some of viewer terminals 180(1) to 180(M) may receive locally a different content to be fused on predefined content insertion region 30, wherein the substitutions of the pixels with the fused content takes into account objects of interest 20 (e.g., moving objects) of the foreground so as to eliminate collisions and obstructions.

According to some embodiments, system 100 may include a virtual rendering server 140 (e.g., as shown in FIG. 1C). Virtual rendering server 140 may be in communication with video processing server 110 and with user terminals 180(1) to 180(M). Virtual rendering server 120 may receive from video processing server 110 video content 105, wherein each frame of the subset of frames of video content 105 is accompanied with the metadata (e.g., described above with respect to FIGS. 1A and 1B).

Virtual rendering server 120 may be further arranged to receive viewer-specific graphic content 130(1) to 130(M). In some embodiments, at least some pixels of at least some of viewer-specific graphic content 130(1) to 130(M) may have a predetermined measure of transparency.

Virtual rendering server 140 may be arranged to generate user-specific video contents 142(1) to 140(M) by substituting all pixels in at least part of the frames of the subset of frames of video content 105 that are contained within predefined content insertion region 30 of background/stationary surface 10, except for the pixels that are indicated by the respective frames' foreground masks 114 as relating to objects of interest 20, with pixels of the corresponding user-specific graphic contents 130(1) to 130(M), using the respective frames' virtual camera models 112. Virtual rendering server 120 may be further arranged to broadcast at least some of user-specific video contents 142(1) to 142(M) to at least some of user terminal(s) 180(1) to 180(M).

Figure 2A:
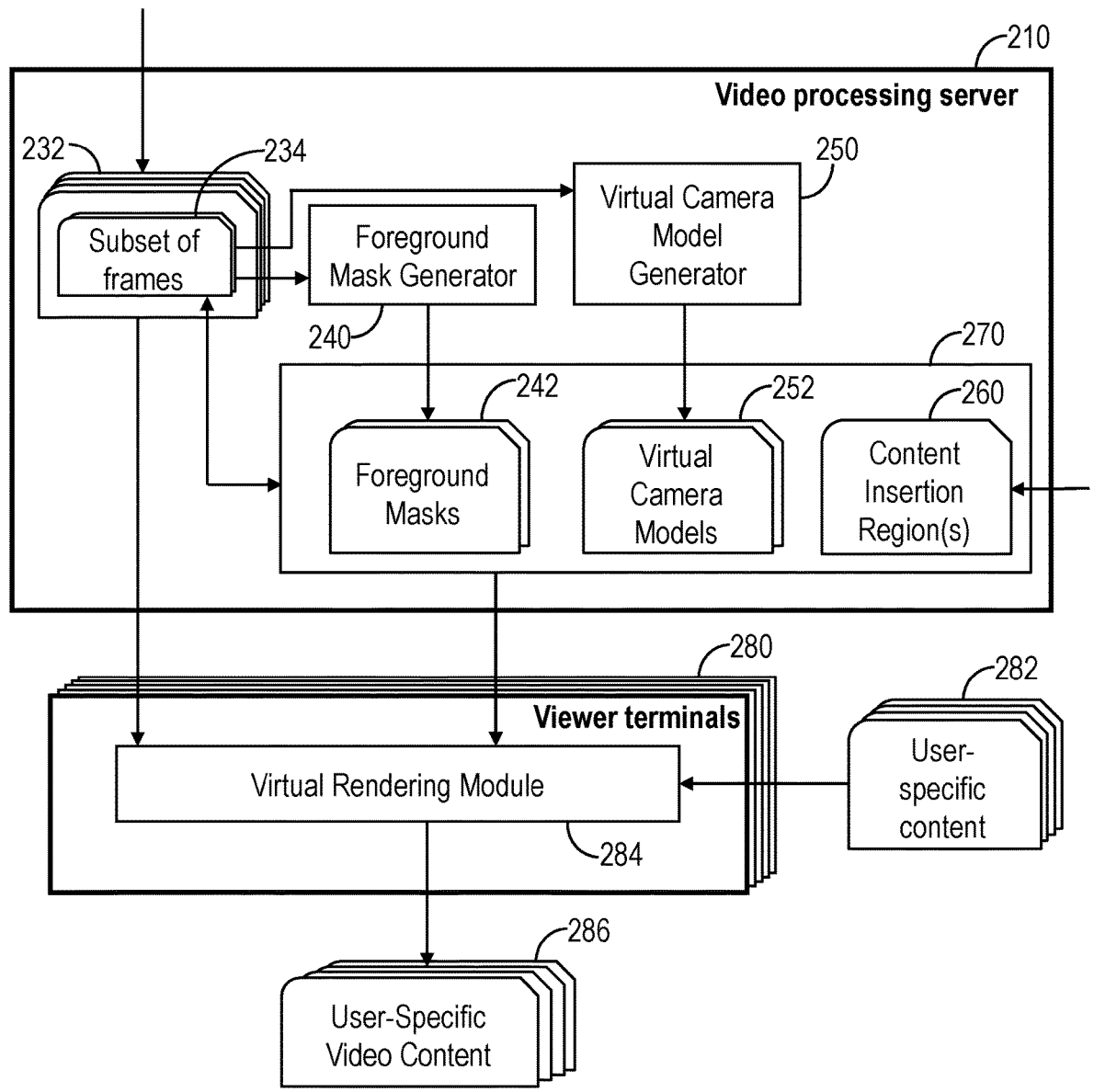
FIGS. 2A, 2B and 2C are schematic illustrations of various configurations of a more detailed aspect of a system for fusing viewer-specific content into a video content being broadcasted to a plurality of user terminals, according to some embodiments of the invention.
Figure 2B:
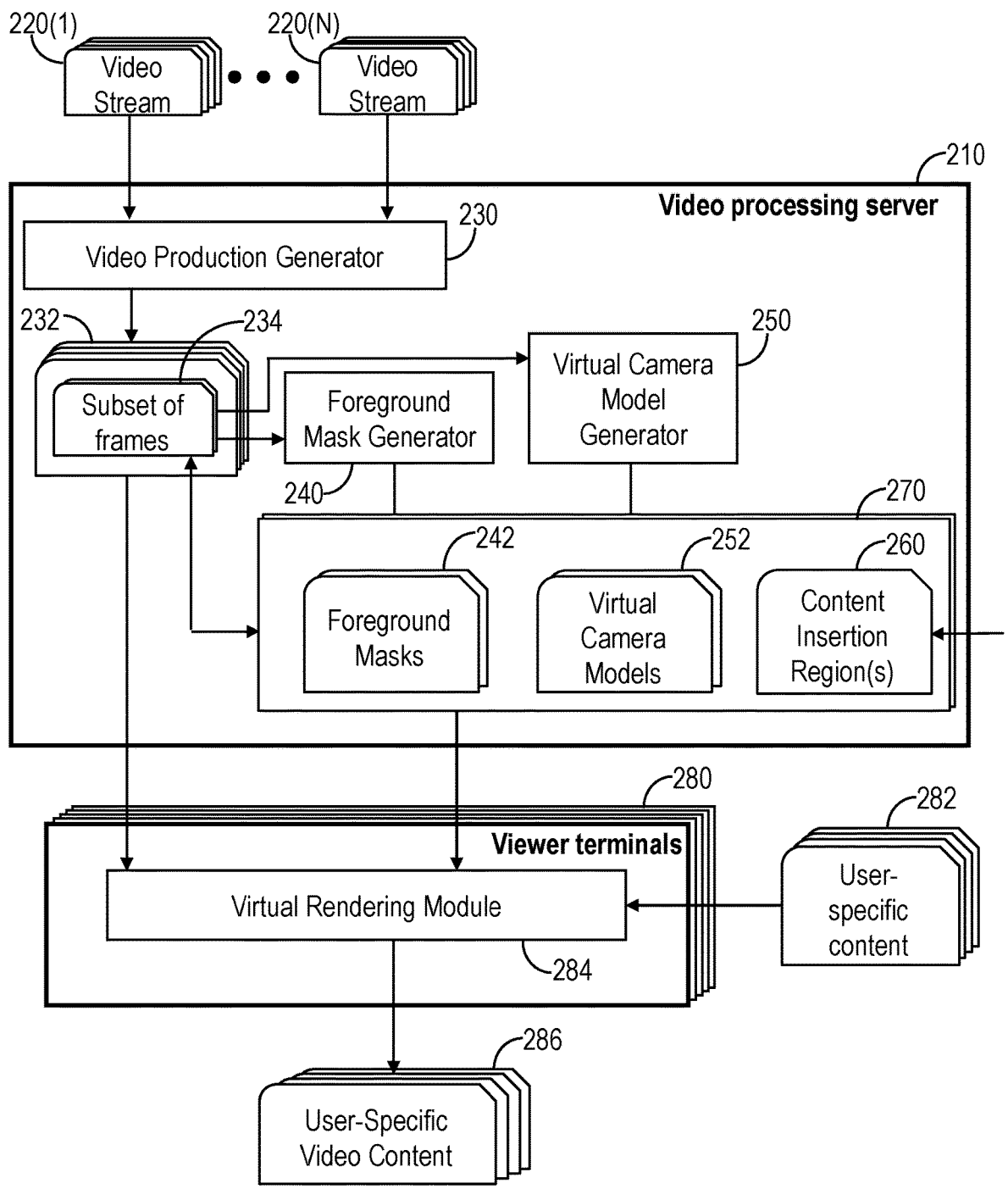
Figure 2C:
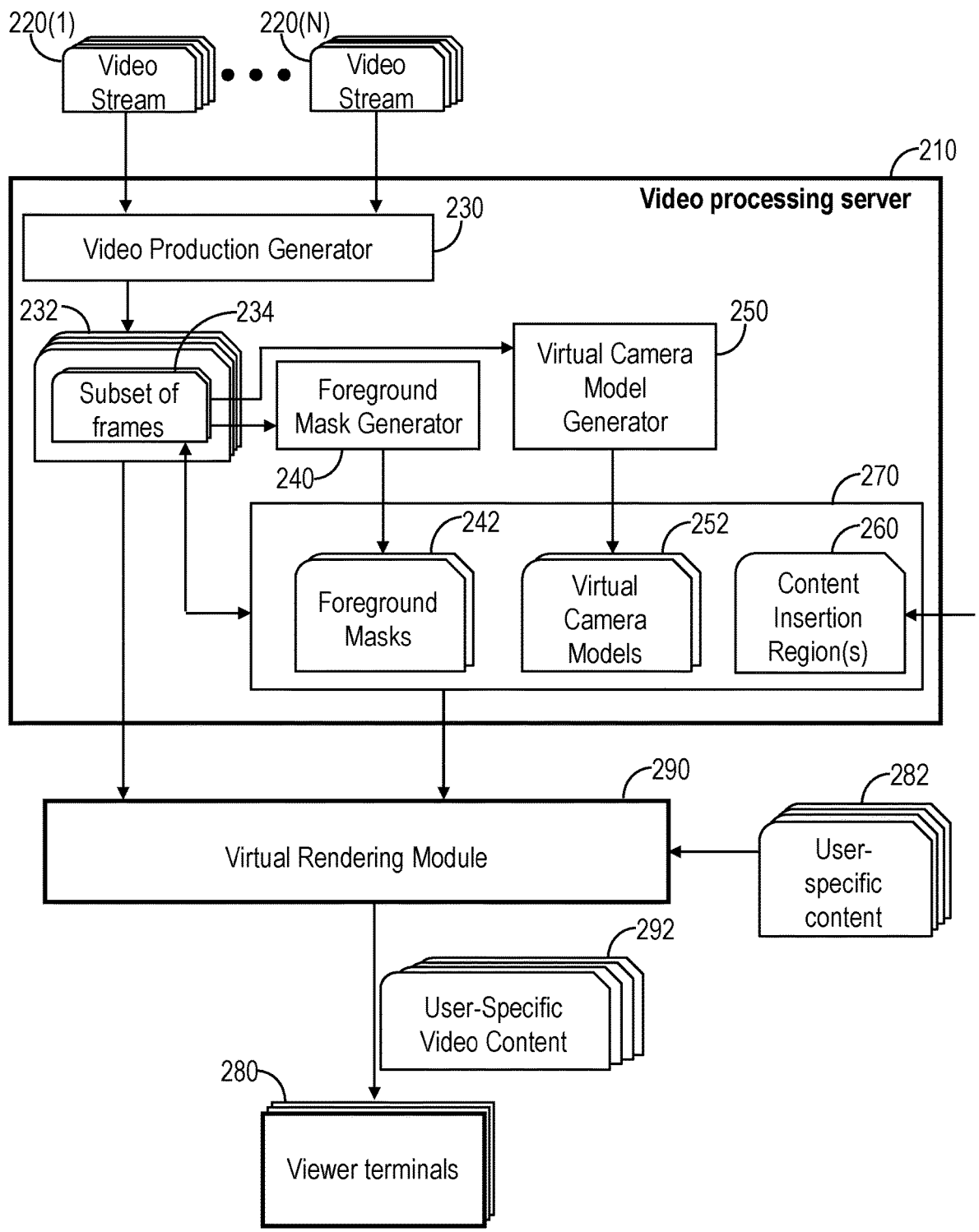

Reference is now made to FIGS. 2A, 2B and 2C, which are schematic illustration of various configurations of a more detailed aspect of a system 200 for fusing viewer-specific content into a video production, according to some embodiments of the invention.

According to some embodiments, system 200 may include a video processing server 210 and a plurality of user terminals 280 in communication with video server 210 (e.g., as shown in FIGS. 2A and 2B).

According to some embodiments, video processing server 210 may receive a video content 232 (e.g., as shown in FIG. 2A). Video content 232 may include a plurality of frames each representing scene 5 at the sport event (e.g., as described above with respect to FIGS. 1A, 1B and 1C).

According to some embodiments, video processing server 210 may include a video production generator 220 (e.g., as shown in FIGS. 2B and 2C). Video production generator 230 may, for example, receive plurality of video streams 220(1) to 220(N) (e.g., generated by corresponding plurality of video cameras, such as cameras 120(1) to 120(N) directed at scene 5 of the sport event, as described above with respect to FIG. 1B). Video production generator 230 may generate a video content 232 including a plurality of frames, based on video streams 220(1) to 220(N).

For example, video production module 230 may selectively combine video streams 220(1) to 220(N) through video editing into video content 232 to "tell a story" of the sport event. The video editing may, for example, include creating combinations and/or reductions of parts of video streams 220(1) to 220(N) in either live event setting (e.g., live production) or after the sport event has occurred (e.g., post-production).

According to some embodiments, video processing server 210 may include a foreground mask generator 240. Foreground mask generator 240 may be arranged to generate a foreground mask for each frame of a subset 234 of frames of the plurality of frames of video content 232, to yield corresponding subset of foreground masks 242. For example, each of plurality of foreground masks 242 may be generated for one frame of subset 234. Each of plurality of foreground masks 242 may include pixels relating to objects of interest 20 in scene 5 (e.g., as described above with respect to FIGS. 1A, 1B and 1C). In some embodiments, the frames of subset 234 are selected based on specified time period(s)/duration(s) of the sport event during which the viewer-specific graphic content is intended to be fused into the video content.

In some embodiments, foreground mask generator 240 may utilize background subtraction methods to generate foreground masks 242. Foreground mask generator 240 may determine a background image, based on at least some of plurality of frames of video content 232. The background image may, for example, include pixels relating to stationary/background surface 10 of the scene. Foreground mask generator 240 may, for example, subtract the background image (that includes pixels relating to background/stationary surface 10) from each frame of the subset of frames of video content 232 (that include pixels relating to both background/stationary surface 10 and objects of interest 20) to yield corresponding subset of foreground masks images 242 (that include pixels relating to objects of interest 20). It would be appreciated that foreground mask generator 240 may also utilize other background subtraction techniques.

In some embodiments, foreground mask generator 240 may utilize chromakeying methods to generate foreground masks 242. Foreground mask generator 240 may, for example, detect and remove all pixels in the frames of the subset of frames of video content 232 relating to background/stationary surface 10 (e.g., that may have substantially the same color) to thereby generate corresponding subset of foreground masks images 242 (that include pixels relating to objects of interest 20). In these embodiments, foreground masks 242 may further include elements on background/stationary surface 10 whose color differs from a dominant color of background/stationary surface 10 (e.g., white-line markings, etc.)

It would be appreciated that foreground mask generator 240 may utilize other methods (e.g., rather than background subtraction and/or chromakeying) to generate foreground masks 242, for example deep learning algorithms.

According to some embodiments, system 200 may include virtual camera model generator 250. Virtual camera generation model 250 may derive, for each frame of subset 234 of frames of video content 232, a virtual camera model, to yield corresponding subset of virtual camera models 252. For example, each of plurality of virtual camera models 252 may be derived for one frame of subset 234.

In some embodiments, each of virtual camera models 252, derived for one frame of subset 234 of video content 232, may correlate each pixel in the respective frame with a real-world geographic location in scene 5 associated with the pixel thereof. The correlation thereof may be done based on, for example, physical parameters of a camera that generated the respective frame. The physical parameters thereof may, for example, include at least a real-world geographic location of the camera with respect to scene 5, orientation of the camera with respect to scene 5 and/or lens parameters such as focal length, distortion, etc.

In various embodiments, the physical parameters of the camera(s) may be determined using, for example, at least one of: sensors located on the camera(s), computer vision methods and/or by panoramic capturing of the scene using plurality of cameras (e.g., such as cameras 120(1) to 120(N), as described above with respect to FIG. 1B). Alternatively or complementarily, the physical parameters attributed to the camera(s) thereof may be received by virtual camera generation model 250 as metadata.

In some embodiments, video processing server 210 may receive as an input at least one content insertion region 260. Content insertion region(s) 260 may include information concerning real-world geographic location(s) on background/stationary surface 10 of scene 5 to be replaced with the viewer-specific content (e.g., as described above with respect to FIGS. 1A and 1B). Content insertion region(s) 260 may be, for example, on a game-field, area(s) surrounding a stadium at which the sport event takes place and/or the entire scene 5. In various embodiments, at least some frames of subset 234 may include single content insertion region 260, or two or more content insertion regions 260.

In some embodiments, video processing server 210 may generate metadata 270 for the frames of subset 234, meaning that each frame of subset 234 may be accompanied with the respective frame's foreground mask 242, the respective mask virtual camera model 252 and content insertion region (s) 260 (e.g., as shown in FIGS. 2A, 2B and 2C). In some embodiments, video processing server 210 may further broadcast video content 232, wherein each frame of subset 234 is accompanied with the respective frame's metadata 270.

According to some embodiments, video content 232 and metadata 270 being broadcasted by video production server 210 may be received by at least some of viewer terminals 280. Each of at least some of viewer terminals 280 may further receive as an input a respective and possibly different viewer-specific graphical content 282 (e.g., as shown in FIGS. 2A and 2B). In some embodiments, at least some pixels of at least some of viewer-specific graphic content 282 may have a predetermined measure of transparency.

At least some of user terminals 280 may include a virtual rendering module 284. Virtual rendering module 284 of each of viewer terminals 280 may be arranged to substitute, for at least part of frames of subset 234 of video content 232, using the respective frames' virtual camera models, all pixels that are contained within predefined content insertion region(s) 260, except for the pixels that are indicated by the respective frames' foreground masks as relating to objects of interest 20, with pixels of user-specific graphic content 282 associated with the respective user terminal.

Thus, at least some of viewers associated with viewer terminals 280 may receive locally a different content to be fused on predefined content insertion region(s) 260, wherein the substitutions of the pixels with the fused content takes into account objects of interest 20 (e.g., moving objects) of the foreground so as to eliminate collisions and obstructions.

According to some embodiments, system 200 may include a virtual rendering server 290 (e.g., as shown in FIG. 2C). Virtual rendering server 290 may be in communication with video processing server 210 and with user terminals 280. Virtual rendering server 290 may receive from video processing server 210 video content 232, wherein each frame of subset 234 is accompanied with metadata 270 (e.g., described above with respect to FIGS. 2A and 2B). Virtual rendering server 290 may be further arranged to receive viewer-specific graphic contents 282 (e.g., as shown in FIG. 2C). In some embodiments, viewer-specific graphic contents 282 may include plurality of alternative graphic contents tailored to specific viewers/groups of viewers (e.g., as described above with respect to FIG. 1C).

Virtual rendering server 290 may be arranged to generate user-specific video contents 292 by substituting all pixels in at least part of the frames of subset 234 of frames of video content 232 that are contained within predefined content insertion region(s) 260 of background/stationary surface 10, except for the pixels that are indicated by the respective frames' foreground masks 242 as relating to objects of interest 20, with pixels of the corresponding user-specific graphic contents 282, using the respective frames' virtual camera models 252. Virtual rendering server 290 may be further arranged to broadcast at least some of user-specific video contents 292 to at least some of user terminals 280 (e.g., as shown in FIG. 2C).

Figure 3:
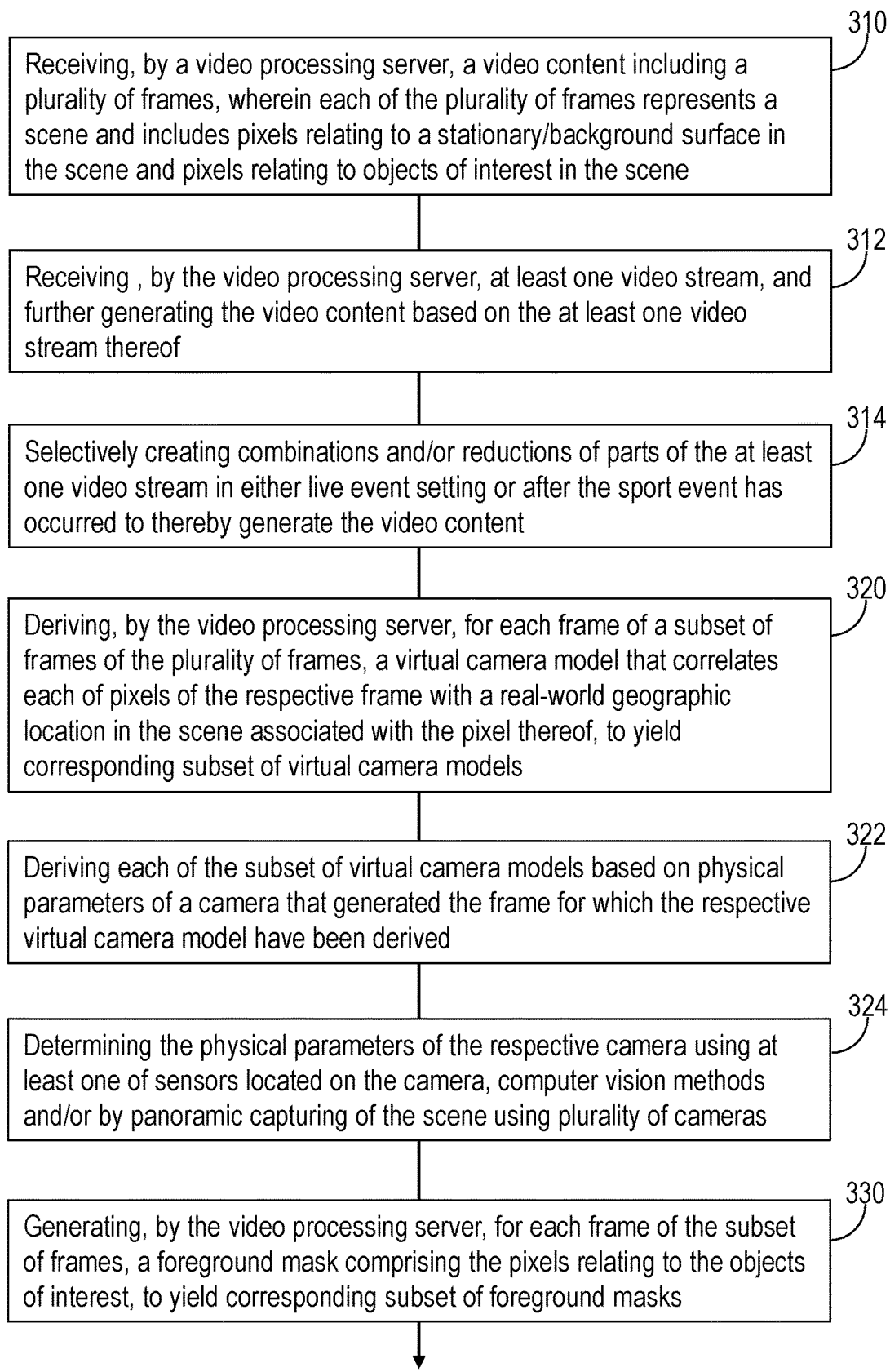
FIG. 3 is a flowchart illustrating a method of fusing viewer-specific content into a video content being broadcasted to a plurality of viewer terminals, according to some embodiments of the invention.

Reference is now made to FIG. 3, which is a flowchart illustrating a method of fusing viewer-specific content into a video content being broadcasted to a plurality of viewer terminals, according to some embodiments of the invention.

According to some embodiments, the method may be implemented by system 100 or system 200, which may be configured to implement the method. It is noted that the method is not limited to the flowcharts illustrated in FIG. 3 and to the corresponding description. For example, in various embodiments, the method needs not move through each illustrated box or stage, or in exactly the same order as illustrated and described.

In some embodiments, the method may include receiving, by a video processing server, a video content including a plurality of frames, wherein each of the plurality of frames represents a scene (e.g., of a sport event) and includes pixels relating to a stationary/background surface in the scene and pixels relating to objects of interest in the scene (stage 310).

In some embodiments, the method may include receiving, by the video processing server, at least one video stream (e.g., from at least one camera directed at the scene), and further generating the video content based on the at least one video stream (stage 312).

In some embodiments, the method may include selectively creating combinations and/or reductions of parts of the at least one video stream in either live event setting (e.g., live production) or after the sport event has occurred (e.g., post-production) to thereby generate the video content (stage 314).

In some embodiments, the method may include deriving, for each frame of a subset of frames of the plurality of frames, a virtual camera model that correlates each of pixels of the respective frame with a real-world geographic location in the scene associated with the pixel thereof, to yield corresponding subset of virtual camera models (stage 320).

In some embodiments, the method may include deriving each of the subset of virtual camera models based on physical parameters of a camera that generated the frame for which the respective virtual camera model has been derived (e.g., at least a real-world geographic location of the camera with respect to the scene, orientation of the camera with respect to the scene and/or les parameters such as focal length, distortion, etc.) (stage 322).

In some embodiments, the method may include determining, by the video processing server, the physical parameters of the respective camera using at least one of sensors located on the camera, computer vision methods and/or by panoramic capturing of the scene using plurality of cameras (stage 324).

In some embodiments, the method may include generating, by the video processing server, for each frame of the subset of frames of video content 232, a foreground mask comprising the pixels relating to the objects of interest, to yield corresponding subset of foreground masks (stage 330).

In some embodiments, the method may include generating a background image, based on at least some of the plurality of frames of video content including pixels relating to the background surface of the scene (e.g., as described above with respect to FIG. 2B) (stage 332).

In some embodiments, the method may include subtracting the background image from each frame of the subset of frames of the video content to yield the corresponding subset of foreground masks (stage 334).

In some embodiments, the method may include detecting and removing all pixels in the frames of the subset of frames of the video content relating to the background surface to thereby generate the corresponding subset of foreground masks images (stage 336).

In some embodiments, the method may include receiving as an input at least one content insertion region including information concerning a real-world geographic location on the background surface of the scene to be replaced with a viewer-specific content (stage 340).

In some embodiments, the method may include generating, by the video processing server, for each frame of the subset of frames of the video content, metadata including the respective frame's foreground mask and the respective frame's virtual camera model (stage 342).

In some embodiments, the method may include broadcasting, by the video processing server, the video content with the metadata (stage 350).

In some embodiments, the method may further include receiving, by at least some of the plurality of viewer terminals, the video content with the metadata and viewer-specific graphic content (stage 352).

In some embodiments, the method may include substituting, by the at least some of the plurality of viewer terminals, in at least part of the frames of the subset of frames of the video content, all pixels in the respective frames contained within the at least one content insertion region of the background surface, except for the pixels indicated by the respective frames' foreground masks, with pixels of the viewer-specific graphic content, using the respective frames' virtual camera models (stage 354).

In some embodiments, the method may further include receiving, by a virtual rendering server, the video content with the metadata and viewer-specific graphic content (stage 360).

In some embodiments, the method may include substituting, by the virtual rendering server, in at least part of the frames of the subset of frames of the video content, all pixels in the respective frames contained within the at least one content insertion region of the background surface, except for the pixels indicated by the respective frames' foreground masks, with pixels of the viewer-specific graphic content, using the respective frames' virtual camera models, to thereby generate viewer-specific video content (stage 362).

In some embodiments, the method may further include broadcasting the viewer-specific video content to at least some of the plurality of viewer terminals (stage 364).

In some embodiments, the method may further include tailoring the viewer-specific graphic content to specific viewers or to specific groups of viewers such that at least some of the plurality of viewer terminals are provide with different viewer-specific graphic content (stage 370).

Advantageously, the disclosed system and method may enable fusion of alternative graphic content into the video content being broadcasted directly on either viewer terminals or virtual rendering server (and remotely from the video processing server), thereby providing high flexibility in tailoring the alternative graphic content to specific viewers/groups of viewers while eliminating a need in repeatable, complex and resource consuming preparation stages of the video content (e.g., generation of the foreground masks and virtual camera models) that may be performed only once on the video processing server.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of fusing viewer-specific graphic content into a video content being broadcasted to a plurality of viewer terminals, the method comprising:
    receiving, by a video processing server, a video content comprising a plurality of frames, wherein each of the plurality of frames represents a scene comprising background surface and objects of interest;
    deriving, by the video processing server, for each frame of a subset of frames of the plurality of frames, a virtual camera model that correlates each of pixels of the respective frame with a real-world geographic location in the scene associated with the pixel thereof;
    generating, by the video processing server, for each frame of the subset of frames, a foreground mask comprising pixels relating to the objects of interest; and
    substituting, by at least some of the plurality of viewer terminals, in at least part of the frames of the subset of frames of the video content, all pixels in the respective frames contained within at least one predefined content insertion region of the background surface, except for the pixels indicated by the respective frames' foreground masks, with pixels of viewer-specific graphic contents associated with the viewer terminals thereof, using the respective frames' virtual camera models.

2. The method of claim 1, further comprising receiving, by the video processing server, at least one video stream and further generating the video content based on the at least one video stream thereof.

3. The method of claim 2, further comprising selectively creating, by the video processing server, combinations and/or reductions of parts of the at least one video stream in either live event setting or after the sport event has occurred to thereby generate the video content.

4. The method of claim 1, further comprising deriving, by the video processing server, each of the subset of virtual camera models based on physical parameters of a camera that generated the frame for which the respective virtual camera model has been derived.

5. The method of claim 4, further comprising determining, by the video processing server, the physical parameters of the respective camera using at least one of sensors located on the camera, computer vision methods and/or by panoramic capturing of the scene using plurality of cameras.

6. A system for fusing viewer-specific graphic content into a video content being broadcasted to a plurality of viewer terminals, the system comprising:
    a video processing server arranged to:

receive a video content comprising a plurality of frames, wherein each of the plurality of frames represents a scene comprising background surface and objects of interest;

derive, for a subset of frames of the plurality of frames of the video content, a virtual camera model correlating each of pixels of the respective frame with a real-world geographic location in the scene associated with the pixel thereof; and generate, for each frame of the subset of frames, a foreground mask comprising the pixels relating to the objects of interest; and a plurality of viewer terminals in communication with the video processing server, wherein at least some of the plurality of viewer terminals is arranged to substitute, in at least part of the frames of the subset of frames, all pixels in the respective frames contained within a predefined content insertion region of the background surface, except for the pixels indicated by the respective foreground masks as related to the objects of interest, with pixels of viewer-specific graphic contents associated with the respective viewer terminals thereof, using the respective virtual camera models.

7. The system of claim 6, further comprising at least one camera directed at the scene and arranged to generate video footage and covey its respective video stream to the video processing server, and wherein the video processing server is further arranged to generate the video content based on the at least one video stream.

8. The system of claim 7, wherein the video processing server is further arranged to selectively create combinations and/or reductions of parts of the at least one video stream in either live event setting or after the sport event has occurred to thereby generate the video content.

9. The system of claim 6, wherein the video processing server is further arranged to derive each of the subset of virtual camera models based on physical parameters of a camera that generated the frame for which the respective virtual camera model have been derived.

10. The system of claim 9, wherein the video processing server is further arranged to determine the physical parameters of the respective camera using at least one of sensors located on the camera, computer vision methods and/or by panoramic capturing of the scene using plurality of cameras.

* * * * *